(12) United States Patent
Gardner (10) Patent No.: US 6,205,439 B1
(45) Date of Patent: Mar. 20, 2001

(54) OPTIMIZATION OF SIMULATION RUN-TIMES BASED ON FUZZY-CONTROLLED INPUT VALUES

(75) Inventor: Chris D. Gardner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/115,702

(22) Filed: Jul. 15, 1998

(51) Int. Cl.[7] ............................. G06F 15/18; G06G 7/00
(52) U.S. Cl. ..................... 706/7; 706/8; 706/9; 706/900
(58) Field of Search ................................. 706/7, 8, 9, 900

(56) References Cited

U.S. PATENT DOCUMENTS

| | | | |
|---|---|---|---|
| 5,285,376 | * | 2/1994 | Struger et al. ...................... 700/18 |
| 5,299,759 | * | 4/1994 | Sherman et al. ................ 244/17.13 |
| 5,549,152 | * | 8/1996 | Davis, Jr. et al. .................. 165/201 |
| 5,720,005 | * | 2/1998 | Coke et al. ......................... 706/900 |
| 5,751,908 | * | 5/1998 | Madau et al. ........................... 706/9 |
| 5,755,378 | * | 5/1998 | Dage et al. ......................... 236/91 C |
| 5,768,479 | * | 6/1998 | Gadelkarim et al. ................ 706/52 |
| 5,806,055 | * | 9/1998 | Zinda, Jr. ............................. 706/45 |
| 5,830,135 | * | 11/1998 | Bosque et al. ....................... 600/323 |

OTHER PUBLICATIONS

Goodridge et al, "Multilayered Fuzzy Behavior Fusion for Real–Time Reactive Control of Systems with Multiple Sensors", IEEE Transactions on Industrial Electronics, Jun. 1996.*

Langer, K. "A System Architecture for Flxible, Knowledge Based, Multimedia CBT–Applications" IEEE first International Conference on Multi–Media Engineering Education, Jul. 1994.*

Kelemen, A:, "Run–Time Autotuning of a robot Controller Using a Genetics based Machine Learning Control Scheme", 1995.*

IEEE: First International Conference on Genetic Algorithms in Engineering Systems.*

Smith, S. M., "A Variable–Structure. Fuzzy Logic Controller with Run–Time Adapation", IEEE Proceedings of the 3rd IEEE Conf. on Fuzzy System, Jun. 1994.*

Bonissone, "Fuzzy Logic Controllers: from Development to Development" IEEE International Conference on Neural Networks, Mar.–Apr. 1993.*

Bodendorf et al, "Hypermedia Navigation Support by Fuzzy Logic and Neural Networks", IEEE International Conference on Intelligent Processing Systems, Oct. 1997.*

Hung, D. L., "Custom Design of a Hardware Fuzzy Logic Controller" IEEE Proceedings of the 3rd IEEE Conference on Fuzzy System.*

Brubaker, "Fuzzy–logic Basics: Intuitive Rules Replace Complex Math," EDN, Jun. 18, 1992.

Zadeh, "Fuzzy Sets," Information and Control, vol. 8, pp. 338–353, 1965.

Mamdani et al., Process Control Using Fuzzy Logic, from Fuzzy Sets–Theory and Applications to Policy Analysis and Information Systems, 1980, pp. 249–265.

* cited by examiner

*Primary Examiner*—George B. Davis
(74) *Attorney, Agent, or Firm*—Dickstein Shapiro Morin & Oshinsky LLP (57) ABSTRACT

An adaptive run-time controller is used to adjust the run-time of a fabrication and assembly process simulation model based on inputs generated by outside forces. The run-time controller utilizes fuzzy logic to evaluate the outside forces against existing control rules to determine new simulation run-times based upon this evaluation. The run-time controller then analyzes and adjusts the existing control rules based on current, historical and trend data. The new rules are integrated into the run-time controller to accurately reflect the current status of the fabrication and assembly process for subsequent simulation runs. As such, the run-time controller inputs and evaluates outside forces that were impossible or impracticable to integrate in the simulation model.

47 Claims, 9 Drawing Sheets

OPTIMIZATION OF SIMULATION RUN-TIMES BASED ON FUZZY-CONTROLLED INPUT VALUES

BACKGROUND OF THE INVENTION

1. Field of the Invention

This invention relates generally to the simulation of a semiconductor fabrication process and, in particular, to the optimization of simulation run-times based on fuzzy-controlled input values.

2. Description of the Related Art

Manufacturers of semiconductor devices are generally placed under a great deal of pressure by their customers for immediate product deliveries. Late product deliveries, or deliveries with less than the ordered number of products, result in lost business to competitors and could lead to financial hardship. One way to avoid production delivery delays is to ensure that the semiconductor fabrication and assembly process is efficiently operated such that all of the manufacturer's production obligations can be satisfied.

Accordingly, manufacturers of semiconductor devices have begun to use computer simulations in an attempt to efficiently manage their semiconductor fabrication and assembly process. Typically, the simulation will model the physical configuration of the fabrication and assembly lines. This model is used to identify potential bottlenecks in the process while also maximizing the equipment and personnel such that "lots" of fabricated and assembled products are efficiently produced. Lots are subsequently used to satisfy product delivery schedules. Since lots may be designated for a particular delivery, they are assigned due dates. Lot due dates, and sizes, as well as resource availability and other production requirements are also used by the simulation to generate dispatch lists. The dispatch lists, which are used by the fabrication and assembly line personnel, include information required to operate their portion of the manufacturing process such that all production obligations are timely satisfied from the produced lots.

To maintain the accuracy of the dispatch lists, the simulation must be periodically rerun to take into account current conditions. Presently, manufacturers will rerun the simulation every few hours regardless of the state of the actual assembly process. A simulation period or "run-time" of every few hours is used so that the assembly line personnel are not constantly working with new dispatch lists and, therefore, are not constantly modifying their portion of the manufacturing process. This is fine when the state of the manufacturing process remains constant. The predefined constant run-time, however, does not bode well when outside factors drastically affect the fabrication and assembly process.

The fabrication and assembly process may be effected by outside forces such as, for example, changes in customer orders, equipment that is broken or not working up to desired specifications and loss of operating personnel. All of these factors, as well as other unforeseen problems, effect the flow of the fabrication and assembly process and need to be accounted for such that new dispatch lists can be created. As stated earlier, manufacturers use a predefined constant run-time, e.g., every few hours, regardless of the state of the actual assembly process. Therefore, if immediately after a simulation has been run, an outside force such as broken equipment alters the flow of the assembly process by producing defective products, for example, it will be at least a few hours before the simulation is rerun. During this time, the assembly process will be producing lots inefficiently. In addition, it may take several simulation reruns to properly modify the fabrication and assembly process such that it returns to an efficient mode of operation. Again, during this time, lots are being produced that are either incorrect in size, or way ahead or behind schedule.

Accordingly, there is a desire and need to optimally adjust simulation run-times based on input parameters generated from outside forces that are impossible to integrate into a simulation model such that longer simulation run-times are used when the flow of the manufacturing process is going well and shorter simulation run-times are used when the flow of the manufacturing process is not going well.

BRIEF SUMMARY OF THE INVENTION

The present inventions provides a method and apparatus for optimally adjusting simulation run-times based on the effects of outside forces that are impossible to integrate into a simulation model such that the flow of an assembly and fabrication process is efficiently managed.

The above features and advantages are achieved by providing an adaptive run-time controller to adjust the run-time of a fabrication and assembly process simulation model based on inputs generated by outside forces. The run-time controller utilizes fuzzy logic to evaluate the outside forces against existing control rules to determine new simulation run-times based upon this evaluation. The run-time controller then analyzes and adjusts the existing control rules based on current, historical and trend data. The new rules are integrated into the run-time controller to accurately reflect the current status of the fabrication and assembly process for subsequent simulation runs. As such, the run-time controller inputs and evaluates outside forces that were impossible or impracticable to integrate in the simulation model.

BRIEF DESCRIPTION OF THE DRAWINGS

The foregoing and other objects and advantages of the invention will become more apparent from the detailed description of the preferred embodiments of the invention given below with reference to the accompanying drawings in which.

DETAILED DESCRIPTION OF THE PREFERRED EMBODIMENTS

The present invention utilizes a technique known in the art as fuzzy logic. Prior to describing the present invention, a brief description of fuzzy logic is provided. Additional information concerning fuzzy logic can be found in, for example, Brubaker, "Fuzzy-logic Basics: Intuitive Rules Replace Complex Math," EDN, Jun. 18, 1992; Zadeh, "Fuzzy Sets," Information and Control, Vol. 8, pp. 338–353, 1965; and Mamdani et al., "Process Control Using Fuzzy Logic," from Fuzzy Sets—Theory and Applications to Policy Analysis and Information Systems, 1980, pp. 249–265 as well as other technical journals.

Computer processors have been developed to function as binary machines whose inputs and outputs break down into a combination of ones and zeroes. No other possibilities may exist. While this works well in most situations, sometimes an answer is not simply one or zero (or yes or no, hot or cold, black or white, etc.), but something in between (e.g., maybe, warm, gray, etc.). Fuzzy logic was developed to enable processors operating on binary logic to provide an answer between yes and no.

Fuzzy logic is a technique that uses membership functions with fuzzy boundaries. Membership functions translate subjective expressions, such as "lot size is medium" into a value which the data processor can recognize. A label such as "small" is used to identify a range of input values whose boundaries are not points at which the label is true on one side and false on the other. Rather, in a system which implements fuzzy logic, the boundaries of the membership functions gradually change and may overlap a boundary of an adjacent membership set. Therefore, a degree of membership is typically assigned to an input value.

Figure 2:
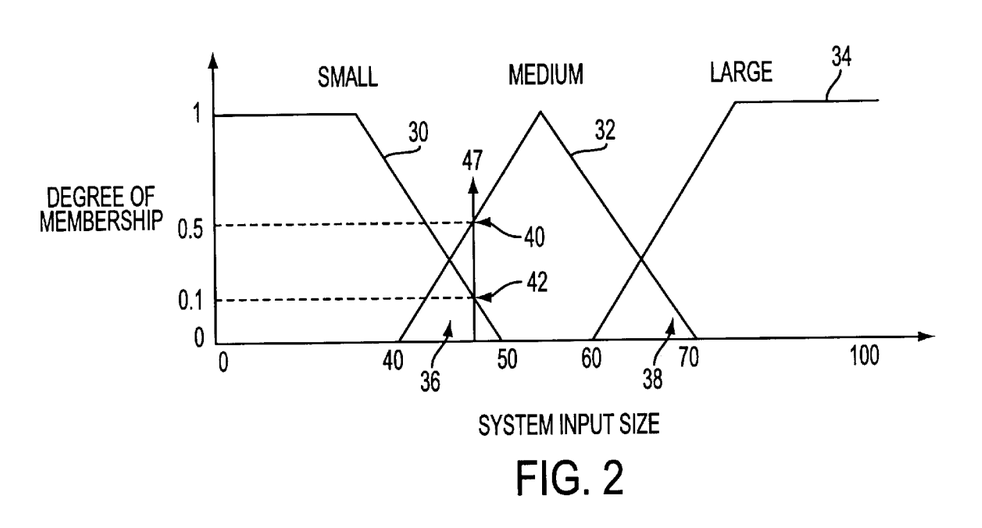
FIG. 2 illustrates a typical fuzzy input set having three membership functions.

FIG. 2 illustrates an example of three membership functions 30, 32, 34 defining "small," "medium" and "large" input sizes. As stated above, the three membership functions have overlapping regions 36, 38. Therefore, an input size of 47, for example, will be contained within the two membership functions 30, 32 labeled small and medium. As will be discussed below, a degree of membership 40, 42 to each of the membership functions 30, 32 is then used to determine an appropriate system output.

Figure 1:
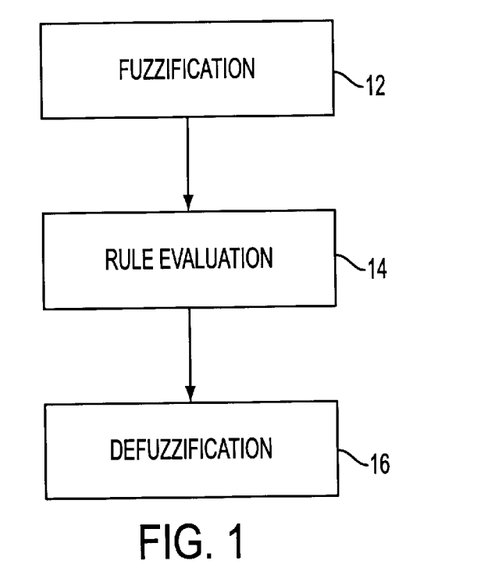
FIG. 1 illustrates in flow chart form the typical steps performed in a fuzzy logic controller.

FIG. 1 illustrates the typical process steps (also known as inference steps) utilized in a fuzzy logic controller. The first step 12 is the fuzzification of the input data. The fuzzification step 12 is used to relate an input to the membership functions 30, 32, 34 (illustrated in FIG. 2). The fuzzification step 12 takes a concrete numerical input value, such as 47, and translates it into a degrees of membership in the membership functions 30, 32, 34 (this is also referred to as degree of truth or fuzzy truth values). Referring to FIG. 2, the input size of 47 is fuzzified into small with a degree of membership of 0.1 (reference numeral 42) and medium with a degree of membership of 0.5 (reference numeral 40).

Figure 3:
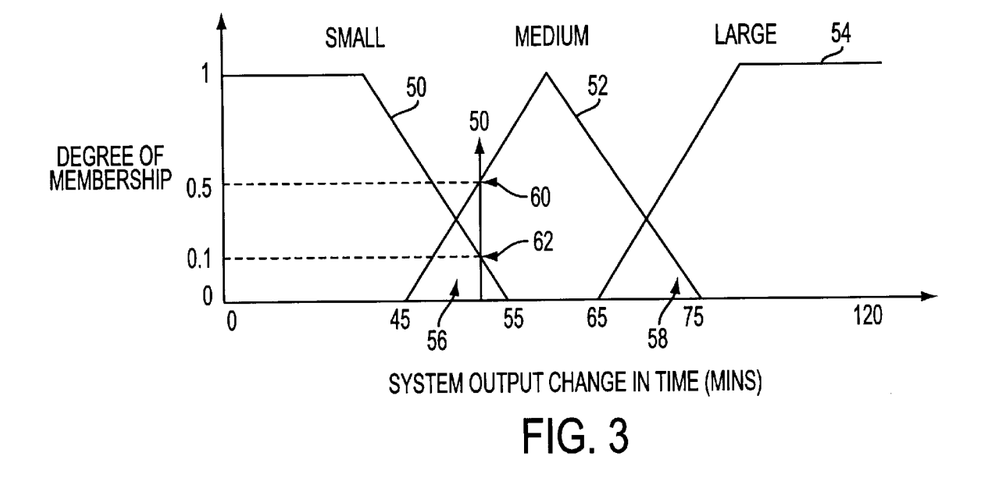
FIG. 3 illustrates a typical fuzzy output set having three membership functions.
Figure 4:
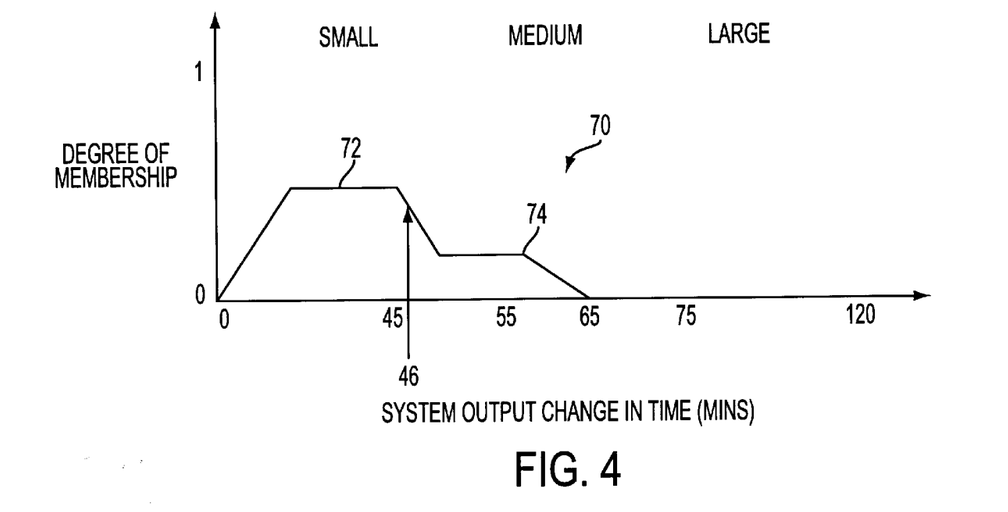
FIG. 4 illustrates a typical fuzzy output solution region.

After the fuzzification step 12, a rule evaluation step 14 is executed. Fuzzy rules are a collection of " if-then" statements that govern how an input should be classified or an output controlled. For example, if the system output is a change in the fabrication process run-time based on the lot size, one rule may be "if the lot size is small then change in the process time is small. " If there are other inputs, number of machines in the process, for example, then another rule might be "if the number of machines is high then the change in the process time is low. " During the rule evaluation step 14, the entire set of rules are evaluated to determine which rules apply and then conclusions are made based on the outcome of the applicable rules. The conclusions from the rule evaluation step 14 are referred to as fuzzy outputs or fuzzy output regions. FIG. 3 illustrates a typical fuzzy output set having a fuzzy output determined by the system input and rules described above. Like the system input (illustrated in FIG. 2), a fuzzy output set will have membership functions 50, 52, 54 defining small, medium and large changes in the process time. The three membership functions 50, 52, 54 also have overlapping regions 56, 58. The varying degrees of membership 60, 62 define the change in process time (approximately 50 minutes) and the output solution region. If other inputs were used, e.g., number of machines in the process, then there would be another fuzzy output region defining a change in process time derived from the number of machines in the process. These two outputs, would have to be combined to formulate one output solution region. FIG. 4 illustrates a sample output solution region 70 having two degrees of output 72, 74.

Referring again to FIG. 1, the last step 16 in the fuzzy logic process is the defuzzification of the output solution region 70 (FIG. 4). The defuzzification step 16 generates a discrete system output value (approximately 46 minutes) from the output solution region 70. One well known method for obtaining the discrete system output value is the "center of gravity defuzzification method." This discrete system output may then be input into a data processor system.

Figure 5:
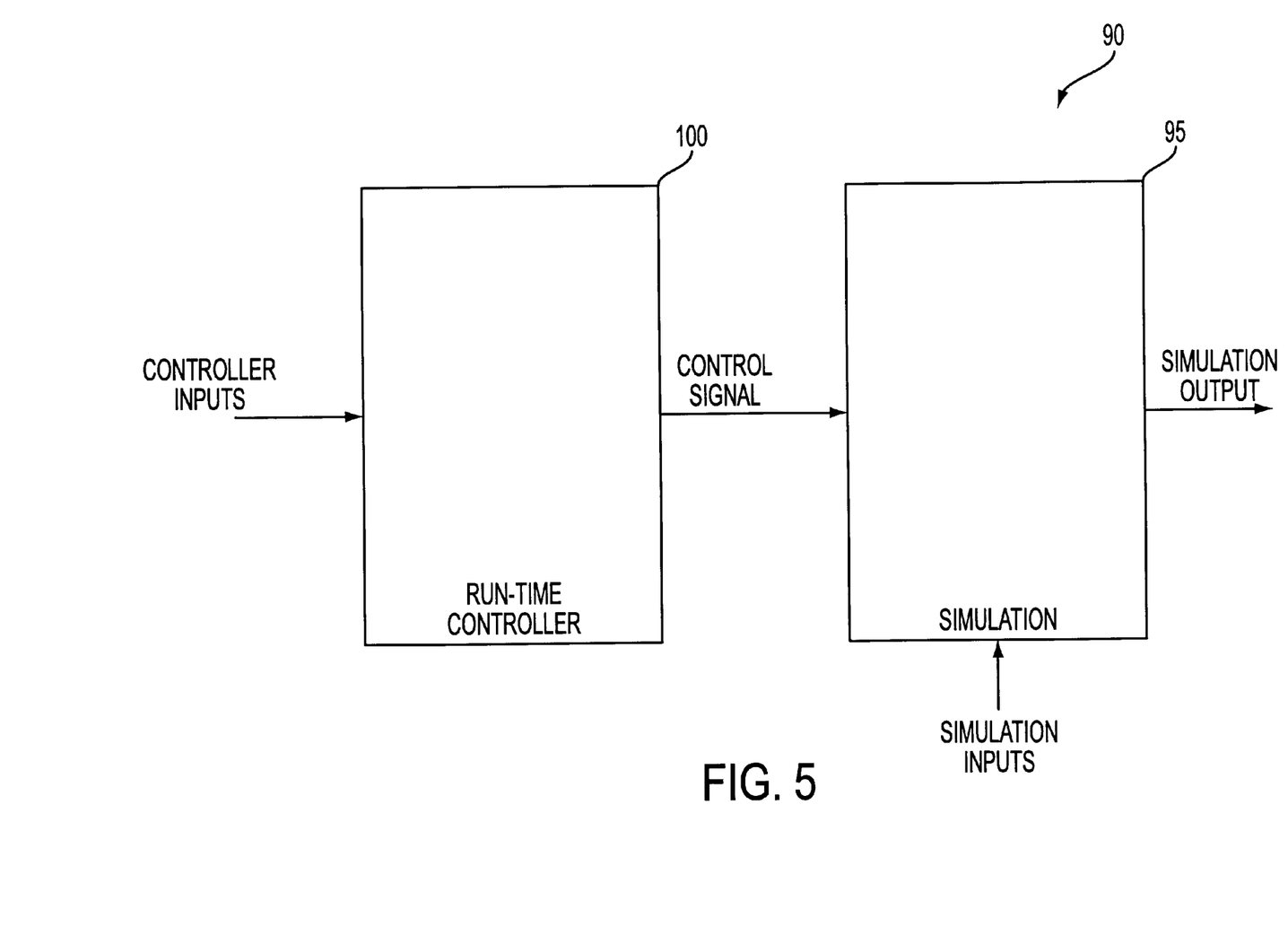
FIG. 5 illustrates a simulation system utilizing a run-time controller constructed in accordance with the present invention.

FIG. 5 illustrates a fabrication and assembly process simulation system 90 including a run-time controller 100 constructed in accordance with the present invention. The system 90 also includes a fabrication and assembly process simulation model 95 in communication with the controller 100. As will be described below, the controller 100 will adjust the run-time of the fabrication and assembly process simulation model 95 based on inputs generated by outside forces. The run-time controller 100 utilizes fuzzy logic to evaluate the outside forces against existing control rules to determine new simulation run-times based upon this evaluation. The controller 100 then analyzes and adjusts the existing control rules based on current, historical and trend data. The new rules are integrated into the controller 100 to accurately reflect the current status of the fabrication and assembly process for subsequent simulation runs. As such, the run-time controller 100 inputs and evaluates outside forces that were impossible or impracticable to integrate in the simulation model 95.

Figure 6:
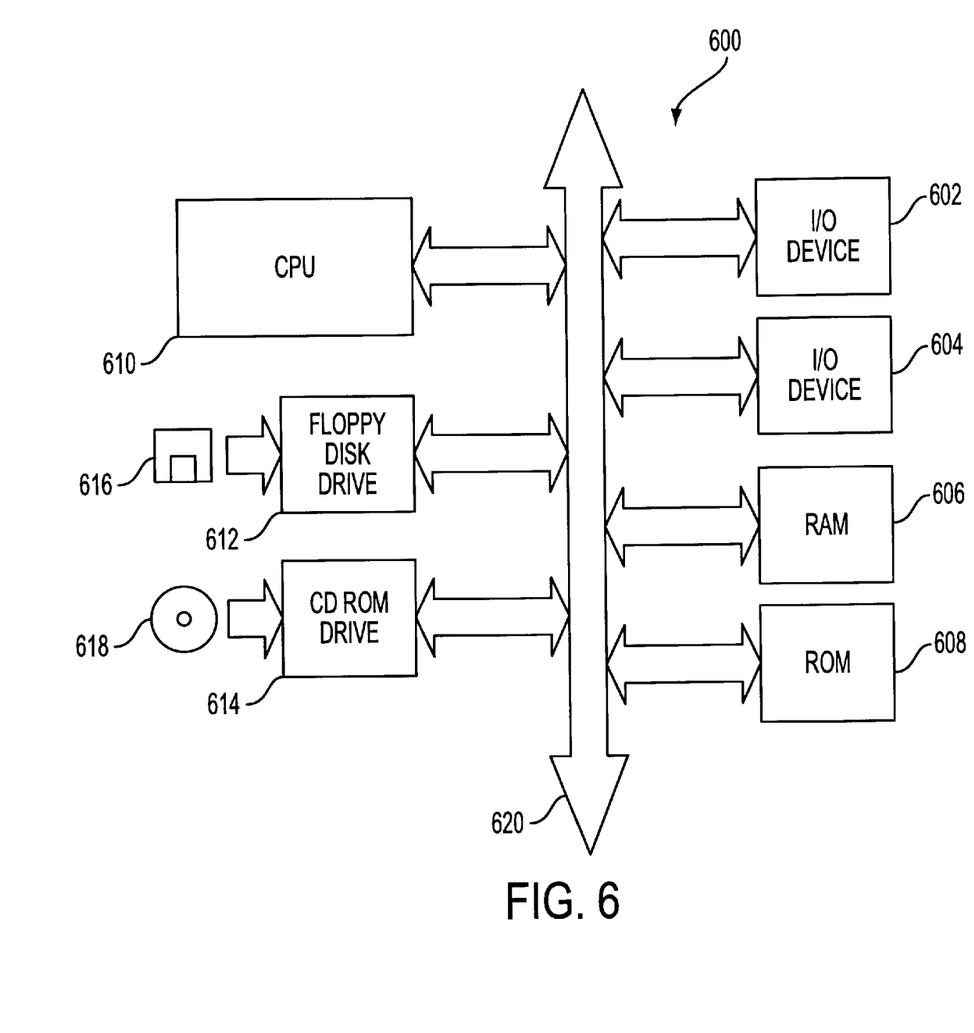
FIG. 6 illustrates a block diagram of a computer system for accomplishing the simulation system illustrated in FIG. 5.

Referring now to FIG. 6, in a preferred embodiment, the controller 100 constructed in accordance with the present invention runs on a programmed general purpose computer system 600. The computer system 600 includes a central processing unit (CPU) 610 that communicates with an input/output (I/O) device 602 over a bus 620. A second I/O device 604 is illustrated, but is not necessary. The computer system 600 also includes random access memory (RAM) 606, read only memory (ROM) 608, and may include peripheral devices such as a floppy disk drive 612 and a compact disk (CD) ROM drive 614 that also communicate with the CPU 610 over the bus 620. It must be noted that the exact architecture of the computer system 600 is not important and that any combination of computer compatible devices may be incorporated into the system 600 as long as the run-time controller 100 can operate on a system 600 having a CPU 610, RAM 606 and storage memory as described below. Moreover, the program for CPU 610 which causes it to implement the invention may be stored in ROM 608, CD-ROM 618, floppy disk 616, a hard drive or any other medium capable of storing a program. During execution of the program it will be loaded into RAM 606. All of these devices communicate with CPU 610 as is well known in the art.

The CPU 610 performs logical and mathematical operations required by the controller 100 of the present invention, such as data manipulation and comparisons, as well as other arithmetic and logical functions generally understood by those of ordinary skill in the art. The RAM 606 is used to store data and program instructions required to implement the controller 100 of the present invention and can be comprised of conventional random access memory (RAM), bulk storage memory, or a combination of both, as generally understood by those of ordinary skill in the art. The I/O devices 602, 604 are responsible for interfacing with an operator of the computer system 610 or with peripheral data devices such as a hard drive or other device (not shown) to receive or distribute data as generally understood by those of ordinary skill in the art.

Figure 7:
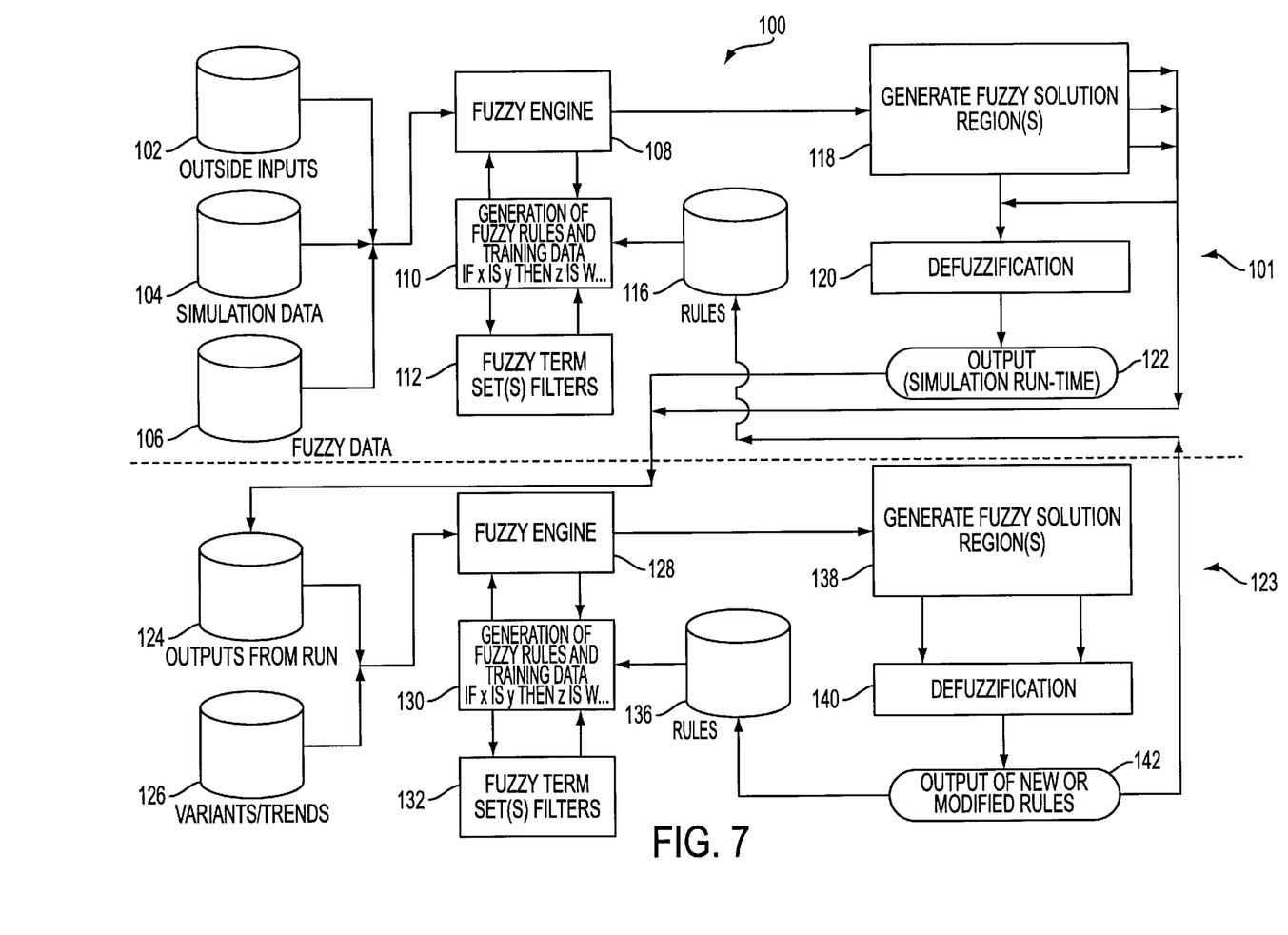
FIG. 7 illustrates a run-time controller constructed in accordance with the present invention.

FIG. 7 illustrates a block diagram of the run-time controller 100 constructed in accordance with the present invention. The controller 100 includes a simulation run-time portion 101 and a rule modification portion 123. The simulation run-time portion 101 generates a change in the simulation run-time (part of output 122) while the rule modification portion 123 adjusts and integrates the control rules 116 such that the controller 100 and thus, the simulation model 95, accurately reflect the current status of the fabrication and assembly process being simulated.

The simulation run-time portion 101 has outside input data 102, simulation data 104, fuzzy data 106 and run-time rules 116 as inputs. Simulation data 104 includes data required to run the simulation 95. It may include information concerning the lots such as where the lot should be at a specified point in time (i.e., how far along in the manufacturing process), lot due date, or any other information required by the simulation 95 to properly simulate the fabrication and assembly process. Fuzzy data 106 includes information required to operate the fuzzy engine 108. The data 106 may include numerical ranges for the data input into, or output from, the fuzzy engine 108 or other information such as the number of inputs or outputs used by the controller 100.

For the purposes of illustration only, two outside factors will be considered and used as the outside inputs 102, but that any number of outside factors that affect the manufacturing process can be used. Accordingly, the outside inputs 102 include 1) whether the actual lots being manufactured are ahead or behind schedule and 2) the change in the number of machines that are currently up or down from when the simulation 95 was last run. These outside inputs 102 reflect problems caused by machinery, personnel and other outside factors which directly affect the operation of the fabrication and assembly process, but are not used in the simulation 95. Therefore, it is very important to integrate these inputs 102 into the run-time controller 100. The two outside inputs 102, lots ahead/behind schedule and change in machines up/down are the preferred outside inputs 102 but, it must be noted that there are other categories that could be used, such as change in personnel, for example, to represent the outside forces.

The run-time rules 116 are used by the fuzzy engine 108 to fuzzify the outside inputs 102. The run-time rules 116 include the input and output fuzzy sets (illustrated in FIGS. 8 and 9) as well as the rules 116a, 116b governing the relationship of the outside inputs 102 to the output 122 of the controller 100. The run-time rules 116 are initially selected by one skilled in the art. As will be discussed below, these rules 116 will be adjusted by the rule modification portion 123. As stated above, the outside inputs 102 will be lots ahead/behind schedule and change in machines up/down while the output of the run-time simulation portion 101 will be a change in simulation run-time based on the outside inputs 102 and the run-time rules 116. An initial simulation run-time of 180 minutes will be used as an example run-time to aid in the description of the run-time rules 116 as well as the operation of the run-time controller 100.

Figure 8:
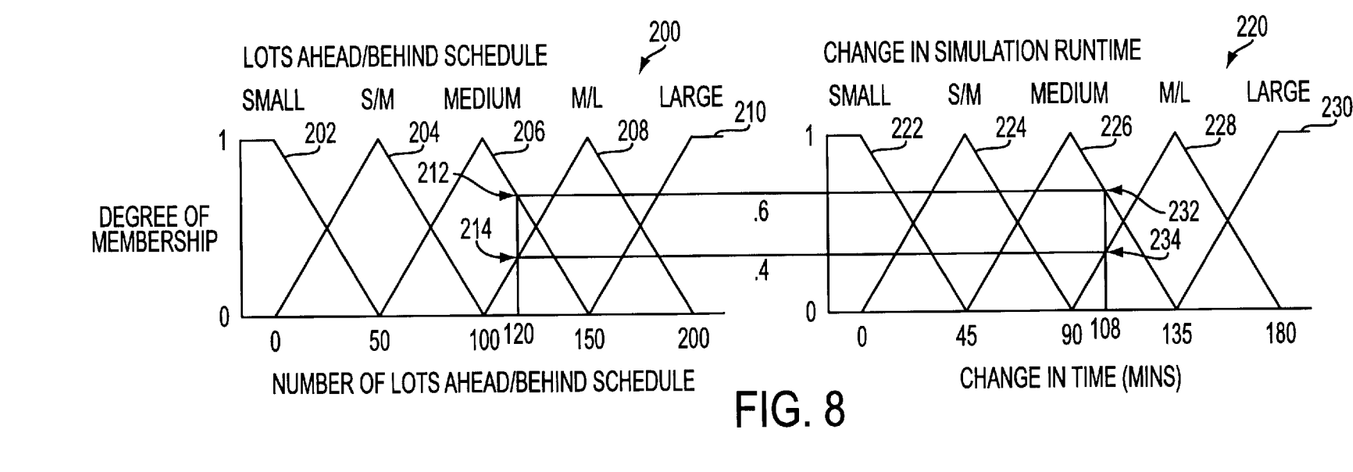
FIG. 8 illustrates fuzzy input and output sets for lots ahead/behind schedule used in the run-time controller constructed in accordance with the present invention.

FIG. 8 illustrates five membership functions 202, 204, 206, 208, 210 (collectively referred to as the lots input fuzzy set 200) defining "small," "small/medium," "medium," "medium/large" and "large" number of lots which are ahead/behind schedule. If the outside inputs 102 indicated that the lots ahead/behind schedule was 120, for example, then the lots ahead/behind schedule would be fuzzified by the fuzzy engine 108 into medium with a degree of membership of 0.6 (reference numeral 212) and medium/large with a degree of membership of 0.4 (reference numeral 214).

As stated above, the run-time rules 116 also include rules 116a, 116b governing the relationship of the outside inputs 102 to the output 122 of the controller 100. Accordingly, the run-time rules 116 include the following rules 116a governing the relationship between the lots ahead/behind schedule (outside input 102) to the change in simulation time (output 122).

TABLE 1

Rules 116a for Lots Ahead/Behind Schedule

1. If lots ahead/behind schedule is small then change in simulation time is small
2. If lots ahead/behind schedule is s/m then change in time is s/m
3. If lots ahead/behind schedule is medium then change in simulation time is medium
4. If lots ahead/behind schedule is m/l then change in simulation time is m/l
5. If lots ahead/behind schedule is large then change in simulation time is large FIG. 8 also illustrates a change in time output set 220 having five membership functions 222, 224, 226, 228, 230 defining "small," "small/medium," "medium," "medium/large" and "large" changes in simulation time based on the fuzzified lots ahead/behind schedule information and the rules 116a listed in Table 1 as will be described below. If the outside inputs 102 indicated that the lots ahead/behind schedule was 120, for example, then the change in simulation time based solely on the lots ahead/behind schedule would be medium with a degree of membership of 0.6 (reference numeral 232) and medium/large with a degree of membership of 0.4 (reference numeral 234). The resultant change in simulation time would then be 108 minutes.

Figure 9:
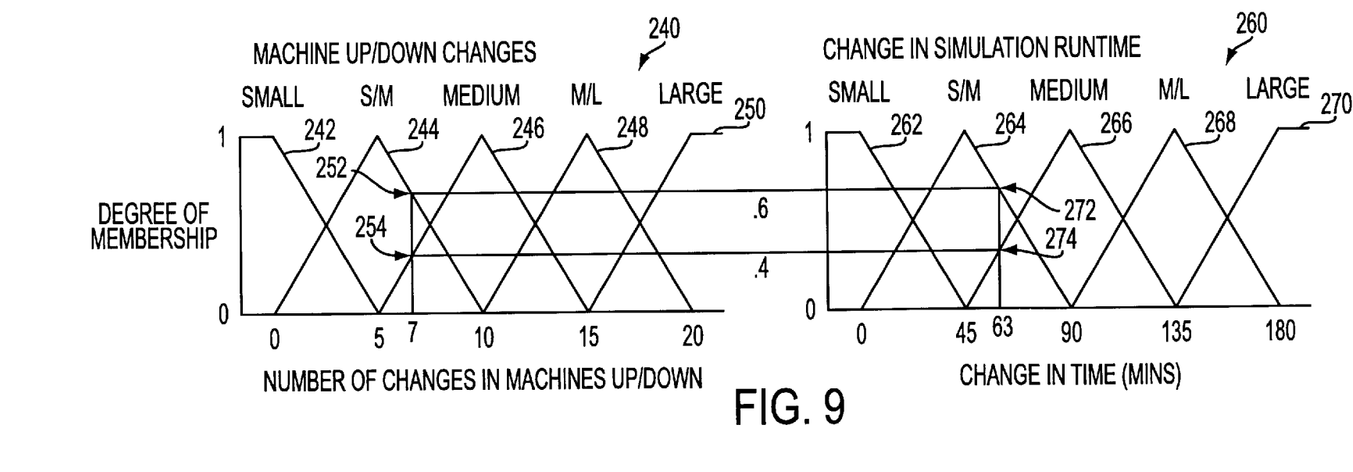
FIG. 9 illustrates fuzzy input and output sets for changes in machines up/down used in the run-time controller constructed in accordance with the present invention.

FIG. 9 illustrates five membership functions 242, 244, 246, 248, 250 (collectively referred to as the machines input fuzzy set 240) defining "small," "small/medium," "medium," "medium/large" and "large" changes in the number of machines up/down. If the outside inputs 102 indicated that the change in machines up/down was 7, for example, then the changes in machines up/down would be fuzzified by the fuzzy engine 108 into small/medium with a degree of membership of 0.6 (reference numeral 252) and medium with a degree of membership of 0.4 (reference numeral 254).

As stated above, the run-time rules 116 also include rules 116a, 116b governing the relationship of the outside inputs 102 to the output 122 of the controller 100. Accordingly, the run-time rules 116 include the following rules 116b governing the relationship between the change in machines up/down (outside input 102) to the change in simulation time (output 122).

TABLE 2

Rules 116b for Changes in Machines Up/Down

1. If machines up/down change is small then change in simulation time is small
2. If machines up/down change is s/m then change in time is s/m
3. If machines up/down change is medium then change in simulation time is medium
4. If machines up/down change is m/l then change in simulation time is m/l
5. If machines up/down change is large then change in simulation time is large FIG. 9 also illustrates a change in time output set 260 having five membership functions 262, 264, 266, 268, 270 defining "small," "small/medium," "medium," "medium/large and" "large" changes in simulation time based on the fuzzified change in machines up/down information and the rules 116b listed in Table 2 (note that the output set 260 is the same as output set 220 and that a new reference numeral is used only to distinguish the different outputs created by the lots ahead/behind schedule and the change in machine up/down). If the outside inputs 102 indicated that the change in the number of machines up/down was 7, for example, then the change in simulation time based solely on the change in machines up/down would be small/medium with a degree of membership of 0.6 (reference numeral 272) and medium with a degree of membership of 0.4 (reference numeral 274).

The resultant change in simulation time would then be 63 minutes.

Referring again to FIG. 7, the operation of the simulation run-time portion 101 is as follows. The outside inputs 102, simulation data 104 and the fuzzy data 106 are input into the fuzzy engine 108. The fuzzy engine 108, using methods well known in the art, fuzzifies the outside inputs 102 as described above with reference to FIGS. 8 and 9. The fuzzy engine 108 then passes this information to a rule generating procedure 110. This procedure 110 inputs the run-time rules 116 and analyzes them to see what rules 116a, 116b apply. In addition, the procedure 110 determines if modifications or combinations of rules 116a, 116b are required based on changes to the fuzzy input or output sets, or it may integrate new variations of rules 116a, 116b to alter one of the outside inputs 102, for example, based on the other outside input 102 (e.g., if lots ahead/behind schedule are small then change in machines up/down is small). The generated rules 116a, 116b may be passed on to a fuzzy term set filter procedure 112 which may filter out regions of data or rules 116a, 116b that are undesirable as determined by the operator of the controller 100.

The generated rules 116 are then input into the fuzzy engine 108. At this point in time, the fuzzy engine 108 has the fuzzified outside inputs 102 and the necessary run-time rules 116 (rules 116a, 116b and output sets) to formulate fuzzy solutions regions. The fuzzy engine 108 passes this information to the generate fuzzy solution regions procedure 118 to formulate the fuzzy solution regions. It must be noted, however, that the fuzzy engine 108 itself could also formulate the solution regions.

The generate fuzzy solution regions procedure 118 generates two separate output solutions. The first output solution is based upon the lots ahead/behind schedule data and the appropriate rules 116 and output set (illustrated in FIG. 8). As stated above with reference to FIG. 8, if the outside inputs 102 indicated that the lots ahead/behind schedule was 120, for example, then the change in simulation time based solely on the lots ahead/behind schedule would be medium with a degree of membership of 0.6 and medium/large with a degree of membership of 0.4. The resultant change in simulation time would then be 108 minutes while the output region would be the area within the medium and medium/large portions of the output set intersected by the two degrees of membership 232, 234 (FIG. 8).

The second output solution is based upon the change in machines up/down data and the appropriate rules 116 and output set (illustrated in FIG. 9). As stated above with reference to FIG. 9, if the outside inputs 102 indicated that the change in the number of machines up/down was 7, for example, then the change in simulation time based solely on the change in machines up/down would be small/medium with a degree of membership of 0.6 and medium with a degree of membership of 0.4. The resultant change in simulation time would then be 63 minutes while the output region would be the area within the small/medium and medium portions of the output set intersected by the two degrees of membership 272, 274 (FIG. 9).

Figure 10:
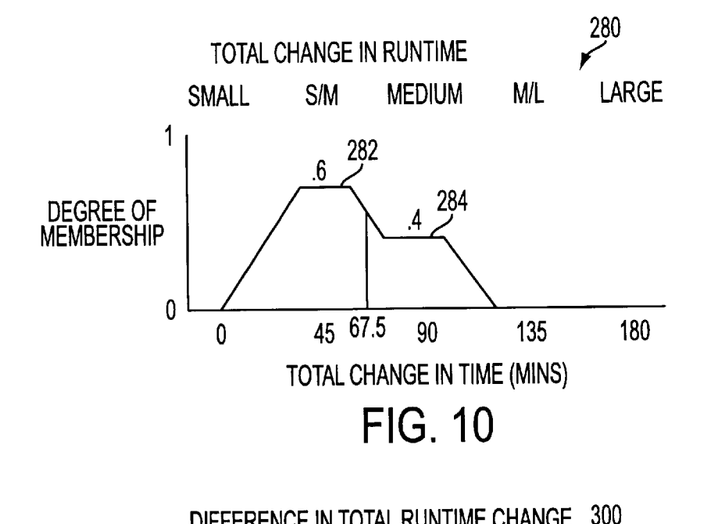
FIG. 10 illustrates a fuzzy output solution region for changes in the simulation run-time created and used by the run-time controller constructed in accordance with the present invention.

Since the controller 100 will only output one change in simulation run-time (output 122), the two solution regions for lots ahead/behind and machines up/down will be combined. One well known method of combining fuzzy output regions is the standard additive method (SAM). SAM uses an "anding" technique to combine numerous fuzzy regions. FIG. 10 illustrates a fuzzy output solution region 280 created using SAM on the outputs illustrated in FIGS. 8 and 9. This region has two degrees of membership 282, 284 covering the small/medium and medium changes in simulation time. This region 280 is defuzzified by the defuzzification procedure 120. The defuzzification procedure 120 uses another well known technique referred to as the center of gravity defuzzification method (COG) to convert the fuzzified data into a discrete output variable equal to 67.5 minutes. This discrete output variable represents the required change in the simulation run-time which is used as the output 122 of the run-time controller 100. This output 122 is used by the controller 100 to calculate a new run-time. The controller 100 subtracts the change in the simulation run-time (67.5 minutes) from the original run-time (180 minutes) to create the new simulation run-time (112.5 minutes). The controller subsequently generates a control signal, at the new run-time, to rerun the simulation 95.

The output 122 is also used as the output from run input 124 into the rule modification portion 123. Accordingly, the output from run input 124 will include the change in simulation time. The rule modification portion 123 also has variant and trend data 126 and modification rules 136 as inputs. As will be discussed below, the rule modification portion 123 takes the output 122 from the simulation run-time portion 101 and uses the trend data 126 and modification rules 136 to modify or delete existing run-time rules 116 or to create new ones.

The variant and trend data 126 includes values of the outside inputs 102 and the change in simulation time calculated by the simulation run-time portion 101 from prior runs of the simulation 95 and the controller 100. The variant and trend data 126 can also include mean averages of the outside inputs 102 and the change in simulation time. These mean averages will be compared to the information contained in the output 122 to modify or delete existing run-time rules 116 or to create new ones. It must be noted that the mean averages of the outside inputs 102 and the change in simulation time do not have to be stored since they can be calculated from the information already contained within the trend data 126. Conversely, it is also possible to store only the mean averages without storing the prior values of the outside inputs 102 and the change in simulation time.

The modification rules 136 are used by the second fuzzy engine 128 to fuzzify the output from run input 124. The modification rules 136 include the modification portion's 123 input and output fuzzy sets (illustrated in FIGS. 11–13) as well as the rules 136a, 136b, 136c governing the relationship of the change in the outside inputs 102 and the change in simulation time to the output 142 of the modification portion 123. The modification rules 136 are initially selected by one skilled in the art. These rules will be used to develop the output 142 from the modification portion 123 of the controller 100. The output 142 will include the new input and output fuzzy sets (i.e., run-time rules 116) to be stored and used by the simulation run-time portion 101.

Figure 11:
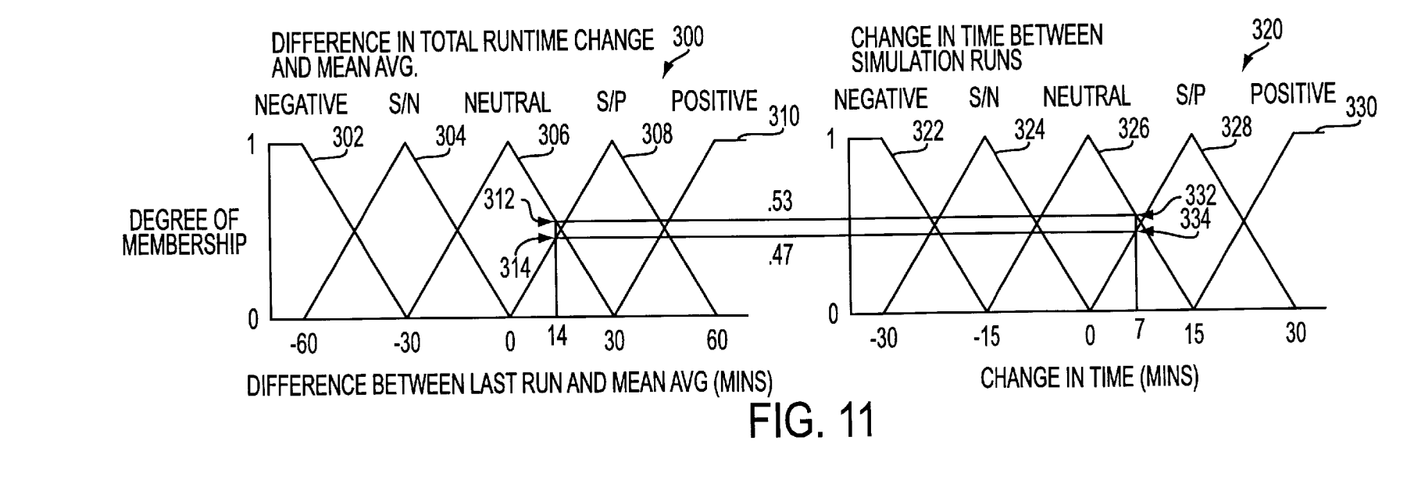
FIG. 11 illustrates fuzzy input and output sets for the difference in time between simulation runs from the mean average of the difference in time between runs used in the run-time controller constructed in accordance with the present invention.

FIG. 11 illustrates five membership functions 302, 304, 306, 308, 310 (collectively referred to as the difference in change of run-time input fuzzy set 300) defining "negative," "small/negative," "neutral," "small/positive" and "positive" differences in the change in simulation run-time from the mean average. If the outputs from run input 124 indicate that the difference in the change in simulation run-time from the mean average of the change in simulation run-time was 14, for example, then the difference in the change in simulation run-time would be fuzzified by the fuzzy engine 128 into neutral with a degree of membership of 0.53 (reference numeral 312) and small/positive with a degree of membership of 0.47 (reference numeral 314).

As stated above, the modification rules 136 also include rules 136a, 136b, 136c governing the relationship of the change in the outside inputs 102 and the change in simulation time to the output 142 of the modification portion 123. Accordingly, the modification rules 136 include the following rules 136a governing the relationship between the change in simulation run-time from the mean average (outputs from run 124) to the change in time between simulation runs (to be used in output 142).

TABLE 3

Rules 136a for Difference in Change of Simulation Run-time

1. If difference in change of run-time is negative then change between runs is negative
2. If difference in change of run-time is s/n then change between runs is s/n
3. If difference in change of run-time is neutral then change between runs is neutral
4. If difference in change of run-time is s/p then change between runs is s/p
5. If difference in change of run-time is positive then change between runs is positive FIG. 11 also illustrates a change in time between simulation runs output set 320 having five membership functions 322, 324, 326, 328, 330 defining "negative," "small/negative," "neutral," "small/positive" and "positive" changes in time between simulation runs based on the fuzzified difference in change in run-time from the mean average information and the rules 136a listed in Table 3 as will be described below. If the outputs from run input 124 indicate that the difference in the change in simulation run-time from the mean average of the change in simulation run-time was 14, for example, then the change in time between simulation runs would be neutral with a degree of membership of 0.53 (reference numeral 332) and small/positive with a degree of membership of 0.47 (reference numeral 334). The resultant change in time between simulation runs would then be 7 minutes.

Figure 12:
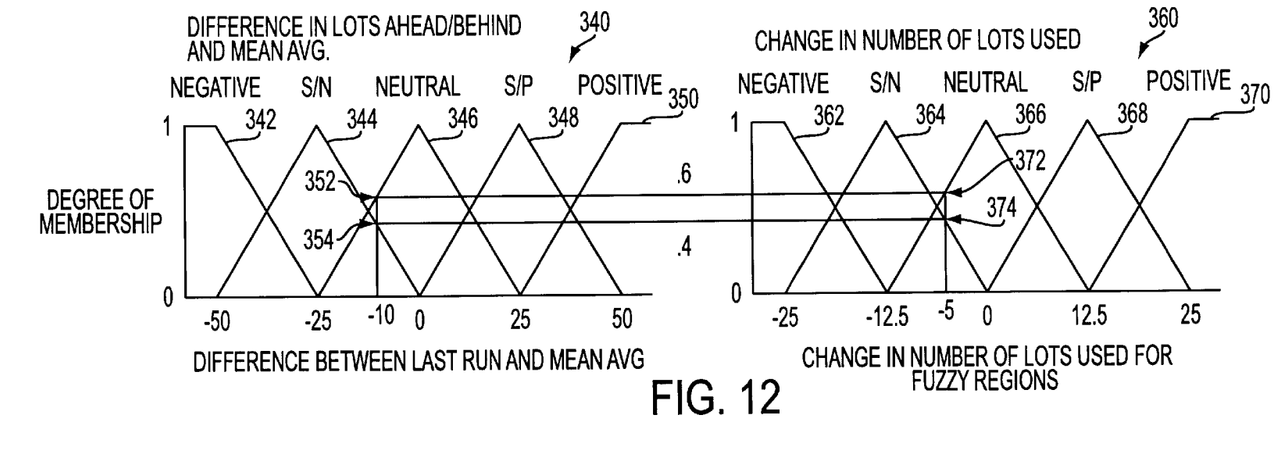
FIG. 12 illustrates fuzzy input and output sets for the differences between lots ahead/behind schedule from the mean average of lots ahead/behind schedule used in the run-time controller constructed in accordance with the present invention.

FIG. 12 illustrates five membership functions 342, 344, 346, 348, 350 (collectively referred to as the difference in lots ahead/behind schedule input fuzzy set 340) defining "negative," "small/negative," "neutral," "small/positive" and "positive" differences in the change in lots ahead/behind schedule from the mean average. If the outside inputs 102 indicate that the difference in the change in lots ahead/behind schedule from the mean average of the change in lots ahead/behind schedule was −10, for example, then the difference in the change in lots ahead/behind schedule would be fuzzified by the fuzzy engine 128 into neutral with a degree of membership of 0.6 (reference numeral 352) and small/negative with a degree of membership of 0.4 (reference numeral 354).

As stated above, the modification rules 136 also include rules 136a, 136b, 136c governing the relationship of the change in the outside inputs 102 and the change in simulation time to the output 142 of the modification portion 123. Accordingly, the modification rules 136 include the following rules 136b governing the relationship between the change in number of lots ahead/behind schedule from the mean average (outputs from run 124) to the change in lots used for the fuzzy input sets (to be used in output 142).

TABLE 4

Rules 136b for Difference in Lots Ahead/Behind Schedule

1. If difference in lots ahead/behind schedule is negative then change in lots is negative
2. If difference in lots ahead/behind schedule is s/n then change in lots is s/n
3. If difference in lots ahead/behind schedule is neutral then change in lots is neutral
4. If difference in lots ahead/behind schedule is s/p then change in lots is s/p
5. If difference in lots ahead/behind schedule is positive then change in lots is positive FIG. 12 also illustrates a change in number of lots used for the fuzzy input sets between simulation runs output set 360 having five membership functions 362, 364, 366, 368, 370 defining "negative," "small/negative," "neutral," "small/positive" and "positive" changes in number of lots used for the fuzzy input set between simulation runs based on the fuzzified difference in the lots ahead/behind schedule from the mean average information and the rules 136b listed in Table 4 as will be described below. If the outside inputs 102 indicate that the difference in the change in lots ahead/behind schedule from the mean average of the change in lots ahead/behind schedule was −10, for example, then the change in lots used for the fuzzy input sets would be neutral with a degree of membership of 0.6 (reference numeral 372) and small/negative with a degree of membership of 0.4 (reference numeral 374). The resultant change in lots used for the fuzzy input sets would then be −5.

Figure 13:
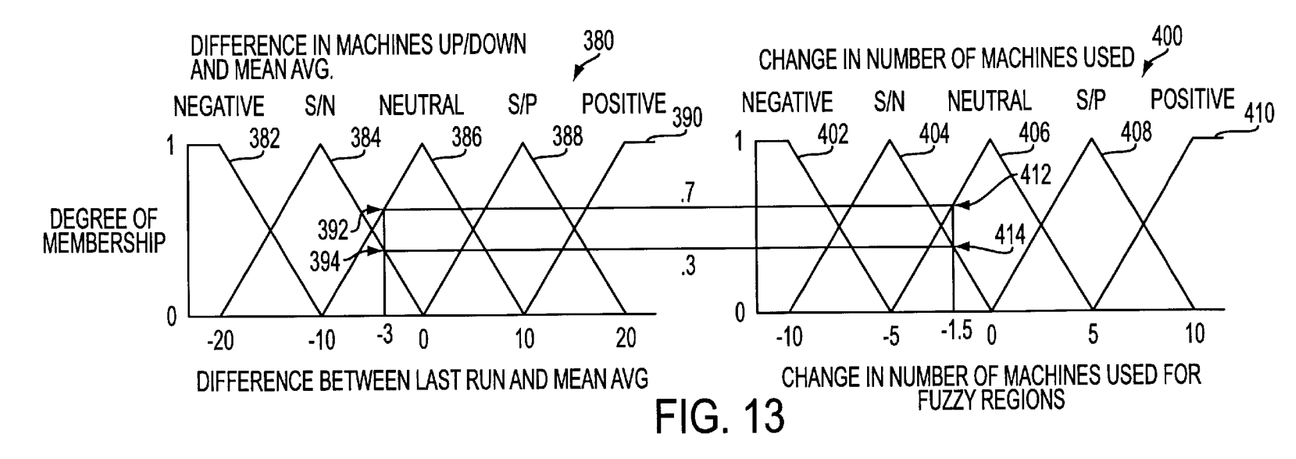
FIG. 13 illustrates fuzzy input and output sets for the differences between changes in machines up/down from the mean average of the changes in machines up/down used in the run-time controller constructed in accordance with the present invention.

FIG. 13 illustrates five membership functions 382, 384, 386, 388, 390 (collectively referred to as the difference in machines up/down input fuzzy set 380) defining "negative," "small/negative," "neutral," "small/positive" and "positive" differences in the change in machines up/down from the mean average. If the outside inputs 102 indicate that the difference in the change in machines up/down from the mean average of the change in machines up/down was −3, for example, then the difference in the change in machines up/down would be fuzzified by the fuzzy engine 128 into neutral with a degree of membership of 0.7 (reference numeral 392) and small/negative with a degree of membership of 0.3 (reference numeral 394).

As stated above, the modification rules 136 also include rules 136a, 136b, 136c governing the relationship of the change in the outside inputs 102 and the change in simulation time to the output 142 of the modification portion 123. Accordingly, the modification rules 136 include the following rules 136c governing the relationship between the change in number of machines up/down from the mean average (outputs from run 124) to the change in machines used for the fuzzy input sets (to be used in output 142).

TABLE 5

Rules 136c for Difference in Machines Up/Down

1. If difference in machines up/down is negative then change in machines used is negative
2. If difference in machines up/down is s/n dien change in machines used is s/n
3. If difference in machines up/down is neutral then change in machines used is neutral
4. If difference in machines up/down is s/p then change in machines used is s/p
5. If difference in machines up/down is positive then change in machines used is positive FIG. 13 also illustrates a change in number of machines used for the fuzzy input sets between simulation runs output set 400 having five membership functions 402, 404, 406, 408, 410 defining "negative," "small/negative," "neutral," "small/positive" and "positive" changes in number of machines used for the fuzzy input set between simulation runs based on the fuzzified difference in the machines up/down from the mean average information and the rules 136c listed in Table 5 as will be described below. If the outside inputs 102 indicate that the difference in the change in machines up/down from the mean average of the change in machines up/down was −3, for example, then the change in machines used for the fuzzy input sets would be neutral with a degree of membership of 0.7 (reference numeral 412) and small/negative with a degree of membership of 0.3 (reference numeral 414). The resultant change in machines used for the fuzzy input sets would then be −1.5.

Referring again to FIG. 7, the operation of the rule modification portion 123 is as follows. The outputs from run input 124 and the variant and trend data 126 are input into the second fuzzy engine 128. As stated above, the variant and trend data 126 contains information concerning the outside inputs 102 and the change in simulation run-time from prior runs of the simulation 95. The variant and trend data 126 are then used to calculate the differences between the last simulation 95 run and all prior simulation 95 runs. The second fuzzy engine 128, using methods well known in the art, fuzzifies these differences as described above with reference to FIGS. 11–13. The second fuzzy engine 128 then passes this information to a second rule generating procedure 130. This procedure 130 inputs the modification rules 136 and analyzes them to see what rules 136a, 136b, 136c apply. In addition, the procedure 130 determines if modifications or combinations of rules 136a, 136b, 136c are required based on changes to the modification portion's 123 fuzzy input or output sets, or it may integrate new variations of rules 136a, 136b, 136c to alter one of the outputs from run inputs 124, for example, based on the other outputs from run inputs 124 (i.e., if difference in lots ahead/behind schedule is small then difference in machines up/down is small). The generated rules 136a, 136b, 136c may be passed on to a second fuzzy term set filter procedure 132 which may filter out regions of data or rules 136a, 136b, 136c not desired by the operator of the controller 100.

The generated rules 136 are then input into the second fuzzy engine 128. At this point in time, the second fuzzy engine 128 has the fuzzified outputs from run inputs 124 and the necessary run-time rules 136 (rules 136a, 136b, 136c and output sets) to the formulate fuzzy solutions regions for the modification portion 123. The second fuzzy engine 128 passes this information to the second generate fuzzy solution regions procedure 138 to formulate the fuzzy solution regions for the modification portion 123. It must be noted, however, that the second fuzzy engine 128 could also formulate the solution regions and the invention is not to be so limited.

The second generate fuzzy solution regions procedure 138 generates three separate output solutions. The first output solution is based upon the difference in lots ahead/behind schedule data and the appropriate rules 136 and output set (illustrated in FIG. 12). As stated above with reference to FIG. 12, if the outputs from run input 124 indicate that the difference in the change in lots ahead/behind schedule from the mean average of the change in lots ahead/behind schedule was −10, for example, then the change in lots used for the fuzzy input sets would be neutral with a degree of membership of 0.6 and small/negative with a degree of membership of 0.4. The resultant change in lots used for the fuzzy input sets would then be −5 while the output region would be the area within the neutral and small/negative portions of the output set intersected by the two degrees of membership 372, 244 (FIG. 12).

The second output solution is based upon the difference in machines up/down data and the appropriate rules 136 and output set (illustrated in FIG. 13). As stated above with reference to FIG. 13, if the outputs from run input 124 indicate that the difference in the change in machines up/down from the mean average of the change in machines up/down was −3, for example, then the change in machines used for the fuzzy input sets would be neutral with a degree of membership of 0.7 and small/negative with a degree of membership of 0.3. The resultant change in machines used for the fuzzy input sets would then be −1.5 while the output region would be the area within the neutral and small/negative portions of the output set intersected by the two degrees of membership 412, 414 (FIG. 13).

The third output solution is based upon the difference in the change in run-time and the appropriate rules 136 and output set (illustrated in FIG. 11). As stated above with reference to FIG. 11, if the outputs from run input 124 indicate that the difference in the change in simulation run-time from the mean average of the change in simulation run-time was 14, for example, then the change in time between simulation runs would be neutral with a degree of membership of 0.53 and small/positive with a degree of membership of 0.47. The resultant change in time between simulation runs would then be 7 minutes while the output region would be the area within the neutral and small/positive portions of the output set intersected by the two degrees of membership 332, 334 (FIG. 11).

Figure 14A:
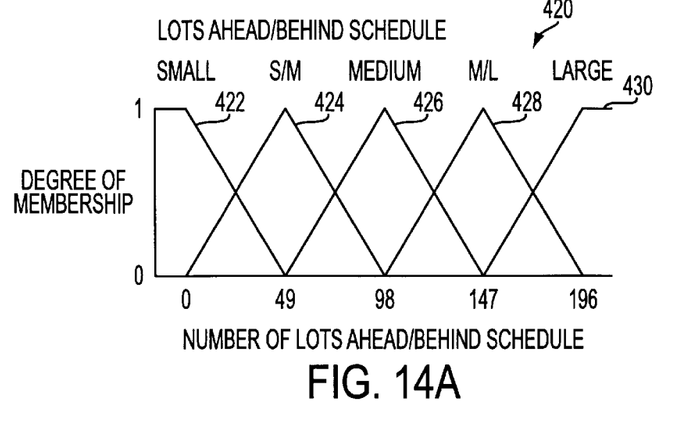
FIGS. 14a and 14b illustrates modified fuzzy input and output sets for lots ahead/behind schedule used in the run-time controller constructed in accordance with the present invention.
Figure 14B:
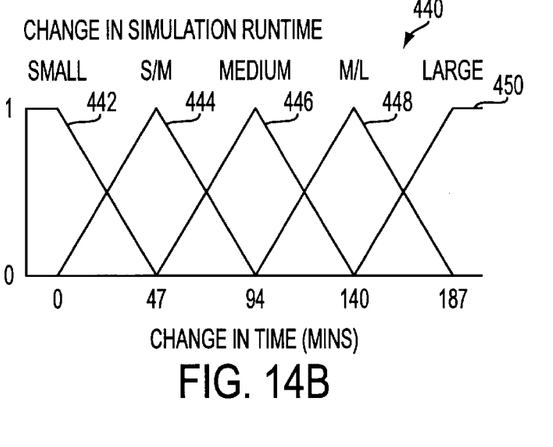
Figure 15A:
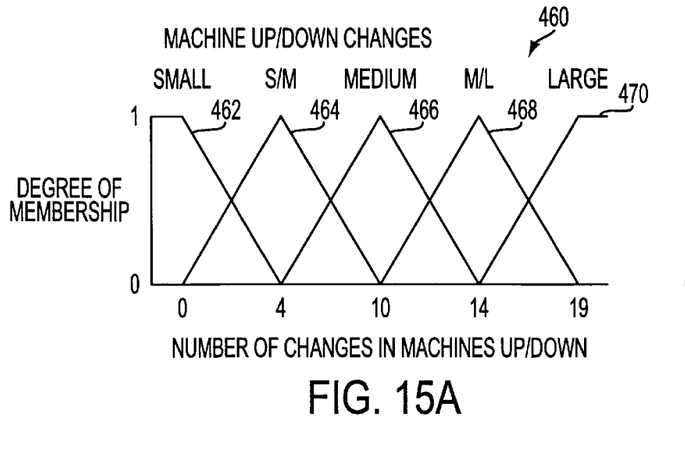
FIGS. 15a and 15b illustrates modified fuzzy input and output sets for changes in machines up/down used in the run-time controller constructed in accordance with the present invention.
Figure 15B:
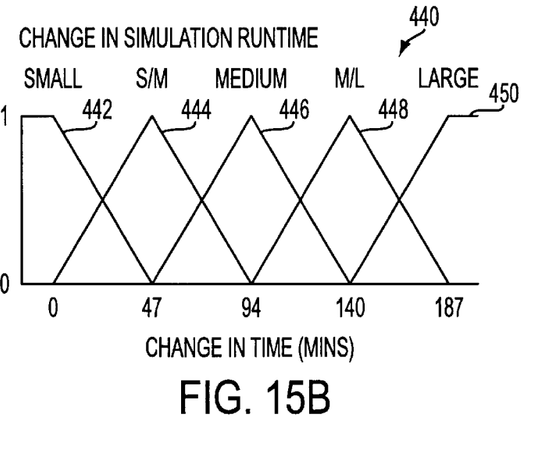

All three output solution regions will have to be defuzzified. Note, that unlike the run-time portion 101, these regions will not be combined since the output 142 will contain separate output information for the change in simulation run-time, change in lots ahead/behind schedule and the change in machines up/down. These regions are defuzzified by the second defuzzification procedure 140. The second defuzzification procedure 140 uses the well known COG method to convert the fuzzified data into a discrete output variables. The discrete output variables are change in time between runs (7 minutes), change in number of lots used in the fuzzy input sets (−5) and change in the number of machines used in the fuzzy input sets (−1.5). These three discrete variables are used to change the input and output sets 200, 220, 240,260 of the run-time portion 101 (illustrated in FIGS. 8 and 9) to the new input and output sets 420, 440, 460 illustrated in FIGS. 14*a*, 14*b*, 15*a*, 15*b*. As illustrated in FIG. 14*a*, the lots/ahead behind input set 420 now has a new range (0 to 196) and different values for the small, small/medium, medium, medium/large and large membership functions 422,424,426, 428,430. As illustrated in FIG. 15*a*, the machines up/down input set 460 now has a new range (0 to 19) and different values for the small, small/medium, medium, medium/large and large membership functions 462, 464, 466, 468,470. As illustrated in FIGS. 14*b*, 15*b*, the change in simulation time output set 440 now have a new range (0 to 187) and different values for the small, small/medium, medium, medium/large and large membership functions 442, 444,446, 448, 450. These new input and output sets are used to update the variant and trend data 126 and the run-time rules 116 of the run-time simulation portion 101.

Accordingly, the output 142 of the rule modification portion 123 has modified the run-time rules 116 of the simulation run-time portion 101. As this point in time, the controller 100 can initiate the next run of the simulation 95 at an appropriate run-time (calculated by the run-time simulation portion 101). Afterwards, the controller 100 can properly analyze the data obtained from the new simulation 95 run to see if changes in the run-time are required to efficiently manage the flow of the fabrication and assembly process in light of the outside inputs. As such, the run-time controller 100 inputs and evaluates outside forces that were impossible or impracticable to integrate in the simulation model 95.

It must be noted that several modifications and alterations of the above described run-time controller 100 are possible. For example, the variant and trend data 126 can contain either all of the past values of the outside inputs 102 and changes in simulation time or it can contain the mean averages of these variables, or both. Likewise, other categories could be used, such as change in personnel, for example, to represent the outside forces used as the two outside inputs 102 (lots ahead/behind schedule and change in machines up/down). In addition, data or rules may be stored globally removing the need to pass the information between separate procedures.

The invention is preferably carried out with a general purpose computer which is programmed to carry out the operations discussed above. However, it should be understood that one or more of the operations described may also be carried out in an equivalent manner by a special purpose computer or hardware circuits. Thus, one or more portions of the invention may be performed with hardware, firmware, software or any combination of these.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

What is claimed as new and desired to be protected by Letters Patent of the United States is:

1. A method of optimizing a run-time of a simulation model, said run-time defining a time when said simulation model is to be initiated, said method comprising the steps of:
inputting at least one variable representing a factor, said factor affecting an output of said simulation model;
converting said at least one variable into respective fuzzy logic input data;
applying respective run-time control rules to said fuzzy logic input data to generate respective fuzzy logic output data, said fuzzy logic output data representing a change in said run-time of said simulation model;
generating an output solution region for said fuzzy logic output data; and
calculating a change in said run-time for said simulation model from said output solution region, wherein said change in said run-time causes said simulation model to be initiated at a new run-time.

2. The method according to claim 1 wherein said step of calculating a change in said run-time for said simulation model is performed by a center of gravity method.

3. The method according to claim 1 wherein said simulation model simulates an integrated circuit fabrication and assembly process.

4. The method according to claim 3 wherein one of said at least one variable represents a number of products being manufactured which are ahead or behind schedule.

5. The method according to claim 3 wherein one of said at least one variable represents a change in a number of processing machines up or down.

6. The method according to claim 3 wherein a number of said at least one variable representing a factor is two and wherein said method generates a respective output solution region for said fuzzy logic output data, said method further comprising the step of combining said output solution regions to form a combined output solution region, and wherein said combined output solution region is used to calculate said change in run-time.

7. The method according to claim 6 wherein said step of generating a combined output solution region is performed by a standard additive method.

8. The method according to claim 1 further comprising the steps of:
inputting modification data respectively representing a trend of said at least one variable and said change in said run-time;
calculating respective differences between said modification data and said at least one variable and said change in said run-time;
converting said respective differences into respective fuzzy logic modification input data;
applying respective modification rules to said fuzzy logic modification input data to generate respective fuzzy logic modification output data, said fuzzy logic modification output data representing a change in said run-time control rules;
generating respective modification output solution regions for said fuzzy logic modification output data; and
calculating a change in each of said run-time control rules from said modification output solution regions.

9. The method according to claim 8 further comprising the steps of:
storing said change in each of said run-time control rules; and
repeating said steps of inputting at least one variable representing a factor to said step of calculating a change in each of said run-time control rules.

10. The method according to claim 8 wherein said modification data comprises respective mean averages of said at least one variable and said change in said run-time.

11. The method according to claim 8 wherein a number of said at least one variable representing a factor is two and wherein said method generates a respective output solution region for said fuzzy logic output data, said method further comprising the step of combining said output solution regions to form a combined output solution region, and wherein said combined output solution region is used to calculate said change in run-time.

12. The method according to claim 11 wherein one of said at least one variable represents a number of products being manufactured which are ahead or behind schedule and one of said modification data is a mean average of said number of products being manufactured which are ahead or behind schedule.

13. The method according to claim 11 wherein one of said at least one variable represents a change in a number of processing machines up or down and one of said modification data is a mean average of said change in a number of processing machines up or down.

14. The method according to claim 8 wherein said step of calculating a change in each of said run-time control rules is performed by a center of gravity method.

15. The method according to claim 8 further comprising the step of generating additional modification rules prior to the step of applying said modification rules to said fuzzy logic modification input data.

16. The method according to claim 1 further comprising the step of generating additional run-time control rules prior to the step of applying said run-time control rules to said fuzzy logic input data.

17. A computer readable storage medium containing a computer readable code for operating a computer to perform a method of optimizing a run-time of a simulation model, said run-time defining a time when said simulation model is to be initiated, said method comprising the steps of:
inputting at least one variable representing a factor, said factor affecting an output of said simulation model;
converting said at least one variable into respective fuzzy logic input data;
applying respective run-time control rules to said fuzzy logic input data to generate respective fuzzy logic output data, said fuzzy logic output data representing a change in said run-time of said simulation model;
generating an output solution region for said fuzzy logic output data; and
calculating a change in said run-time for said simulation model from said output solution region, wherein said change in said run-time causes said simulation model to be initiated at a new run-time.

18. The computer readable storage medium according to claim 17 wherein said method performs said of calculating a change in said run-time for said simulation model by a center of gravity method.

19. The computer readable storage medium according to claim 17 wherein said simulation model simulates an integrated circuit fabrication and assembly process.

20. The computer readable storage medium according to claim 19 wherein one of said at least one variable represents a number of products being manufactured which are ahead or behind schedule.

21. The computer readable storage medium according to claim 19 wherein one of said at least one variable represents a change in a number of processing machines up or down.

22. The computer readable storage medium according to claim 19 wherein a number of said at least one variable representing a factor is two and wherein said method generates a respective output solution region for said fuzzy logic output data, said method further comprising the step of combining said output solution regions to form a combined output solution region, and wherein said combined output solution region is used to calculate said change in run-time.

23. The computer readable storage medium according to claim 22 wherein said method performs said step of generating a combined output solution region by a standard additive method.

24. The computer readable storage medium of claim 17 wherein said method further comprises the steps of:
inputting modification data respectively representing a trend of said at least one variable and said change in said run-time;
calculating respective differences between said modification data and said at least one variable and said change in said run-time;
converting said respective differences into respective fuzzy logic modification input data;
applying respective modification rules to said fuzzy logic modification input data to generate respective fuzzy logic modification output data, said fuzzy logic modification output data representing a change in said run-time control rules;
generating respective modification output solution regions for said fuzzy logic modification output data; and
calculating a change in each of said run-time control rules from said modification output solution regions.

25. The computer readable storage medium according to claim 24 wherein said method further comprises the steps of:
storing said change in each of said run-time control rules; and
repeating said steps of inputting at least one variable representing a factor to said step of calculating a change in each of said run-time control rules.

26. The computer readable storage medium according to claim 25 further comprising the step of generating additional modification rules prior to the step of applying said modification rules to said fuzzy logic modification input data.

27. The computer readable storage medium according to claim 24 wherein said modification data comprises respective mean averages of said at least one variable and said change in said run-time.

28. The computer readable storage medium according to claim 24 wherein one of said at least one variable represents a number of products being manufactured which are ahead or behind schedule and one of said modification data is a mean average of said number of products being manufactured which are ahead or behind schedule.

29. The computer readable storage medium according to claim 24 wherein one of said at least one variable represents a change in a number of processing machines up or down and one of said modification data is a mean average of said change in a number of processing machines up or down.

30. The computer readable storage medium according to claim 24 wherein said method performs said step of calculating a change in each of said run-time control rules by a center of gravity method.

31. The computer readable storage medium according to claim 17 further comprising the step of generating additional run-time control rules prior to the step of applying said run-time control rules to said fuzzy logic input data.

32. A programmed computer simulation model run-time optimization system comprising:

means for inputting at least one variable representing a factor, said factor affecting an output of said simulation model;

means for converting said at least one variable into respective fuzzy logic input data;

means for applying respective run-time control rules to said fuzzy logic input data to generate respective fuzzy logic output data, said fuzzy logic output data representing a change in said run-time of said simulation model;

means for generating an output solution region for said fuzzy logic output data; and means for calculating a change in said run-time for said simulation model from said output solution region, wherein said run-time defines a time when said simulation model is to be initiated and said change in said run-time causes said simulation model to be initiated at a new run-time.

33. The system according to claim 32 wherein said means for calculating a change in said run-time for said simulation model uses a center of gravity method to perform said calculation.

34. The system according to claim 32 wherein said simulation model simulates an integrated circuit fabrication and assembly process.

35. The system according to claim 34 wherein one of said at least one variable represents a number of products being manufactured which are ahead or behind schedule.

36. The system according to claim 34 wherein one of said at least one variable represents a change in a number of processing machines up or down.

37. The system according to claim 34 wherein a number of said at least one variable representing a factor is two and wherein said means for generating an output solution region generates a respective output solution region for said fuzzy logic output data, wherein said system further comprises:

means for combining said output solution regions to form a combined output solution region, wherein said combined output solution region is used to calculate said change in run-time.

38. The system according to 37 wherein said means for generating a combined output solution region uses a standard additive method to perform said combination.

39. The system according to claim 32 further comprising:

means for inputting modification data respectively representing a trend of said at least one variable and said change in said run-time;

means for calculating respective differences between said modification data and said at least one variable and said change in said run-time;

means for converting said respective differences into respective fuzzy logic modification input data;

means for applying respective modification rules to said fuzzy logic modification input data to generate respective fuzzy logic modification output data, said fuzzy logic modification output data representing a change in said run-time control rules;

means for generating respective modification output solution regions for said fuzzy logic modification output data; and means for calculating a change in each of said run-time control rules from said modification output solution regions.

40. The system according to claim 39 further comprising means for storing said change in each of said run-time control rules.

41. The system according to claim 39 wherein said modification data comprises respective mean averages of said at least one variable and said change in said run-time.

42. The system according to claim 39 wherein a number of said at least one variable representing a factor is two and wherein said means for generating an output solution region generates a respective output solution region for said fuzzy logic output data, wherein said system further comprising:

means for combining said output solution regions to form a combined output solution region, wherein said combined output solution region is used to calculate said change in run-time.

43. The system according to claim 39 wherein one of said at least one variable represents a number of products being manufactured which are ahead or behind schedule and one of said modification data is a mean average of said number of products being manufactured which are ahead or behind schedule.

44. The system according to claim 39 wherein one of said at least one variable represents a change in a number of processing machines up or down and one of said modification data is a mean average of said change in a number of processing machines up or down.

45. The system according to claim 39 wherein said means for calculating a change in each of said run-time control rules uses a center of gravity method to perform said calculation.

46. The system according to claim 39 further comprising the step of means for generating additional modification rules to be applied to said fuzzy logic modification input data.

47. The system according to claim 32 further comprising:

means for generating additional run-time control rules to be applied to said fuzzy logic input data.

* * * * *

UNITED STATES PATENT AND TRADEMARK OFFICE
CERTIFICATE OF CORRECTION

PATENT NO. : 6,205,439 B1
DATED : March 20, 2001
INVENTOR(S) : Chris D. Gardner

It is certified that error appears in the above-identified patent and that said Letters Patent is hereby corrected as shown below:

<u>Title page,</u>
Item [56] References Cited:
Under subheading OTHER PUBLICATIONS, "Langer, K. "A System Architecture for Flxible, Knowledge" should read -- Langer, K. "A System Architecture for Flexible, Knowledge --.

<u>Column 3</u>
Line 16, "illustrates" should read -- illustrate --.
Line 20, "illustrates" should read -- illustrate --.

Signed and Sealed this

Sixteenth Day of October, 2001

Attest:

NICHOLAS P. GODICI
*Attesting Officer*    *Acting Director of the United States Patent and Trademark Office*